United States Patent [19]

Stadler

[11] Patent Number: 5,186,356
[45] Date of Patent: Feb. 16, 1993

[54] CONVEYOR UNLOADING MECHANISM
[75] Inventor: Jeffery A. Stadler, Fenton, Mich.
[73] Assignee: Excel Corporation, Fenton, Mich.
[21] Appl. No.: 653,140
[22] Filed: Feb. 11, 1991
[51] Int. Cl.⁵ .......................................... B65G 59/00
[52] U.S. Cl. ................................. 221/250; 221/267; 221/270
[58] Field of Search ............... 221/232, 268, 267, 293, 221/270, 224, 250; 227/149, 139

[56] References Cited

U.S. PATENT DOCUMENTS

| | | | |
|---|---|---|---|
| 468,734 | 2/1892 | Unbehend | 227/139 |
| 1,116,849 | 11/1914 | Sasseman | 221/268 |
| 2,266,933 | 12/1941 | Williams | 221/268 |
| 2,462,922 | 3/1949 | Temple | 221/232 |
| 4,703,882 | 11/1987 | Herten | 227/149 |
| 4,838,411 | 6/1989 | Rainey et al. | 198/774.3 |

FOREIGN PATENT DOCUMENTS 3028227 2/1982 Fed. Rep. of Germany ...... 227/149

*Primary Examiner*—H. Grant Skaggs
*Attorney, Agent, or Firm*—Gifford, Groh, Sprinkle, Patmore and Anderson

[57] ABSTRACT

A stripper assembly for unloading parts from an accumulating conveyor. The parts are moved by the conveyor between pivoting lever arms which hold the part as a push blade advances the part downward to a gravity release position.

5 Claims, 3 Drawing Sheets

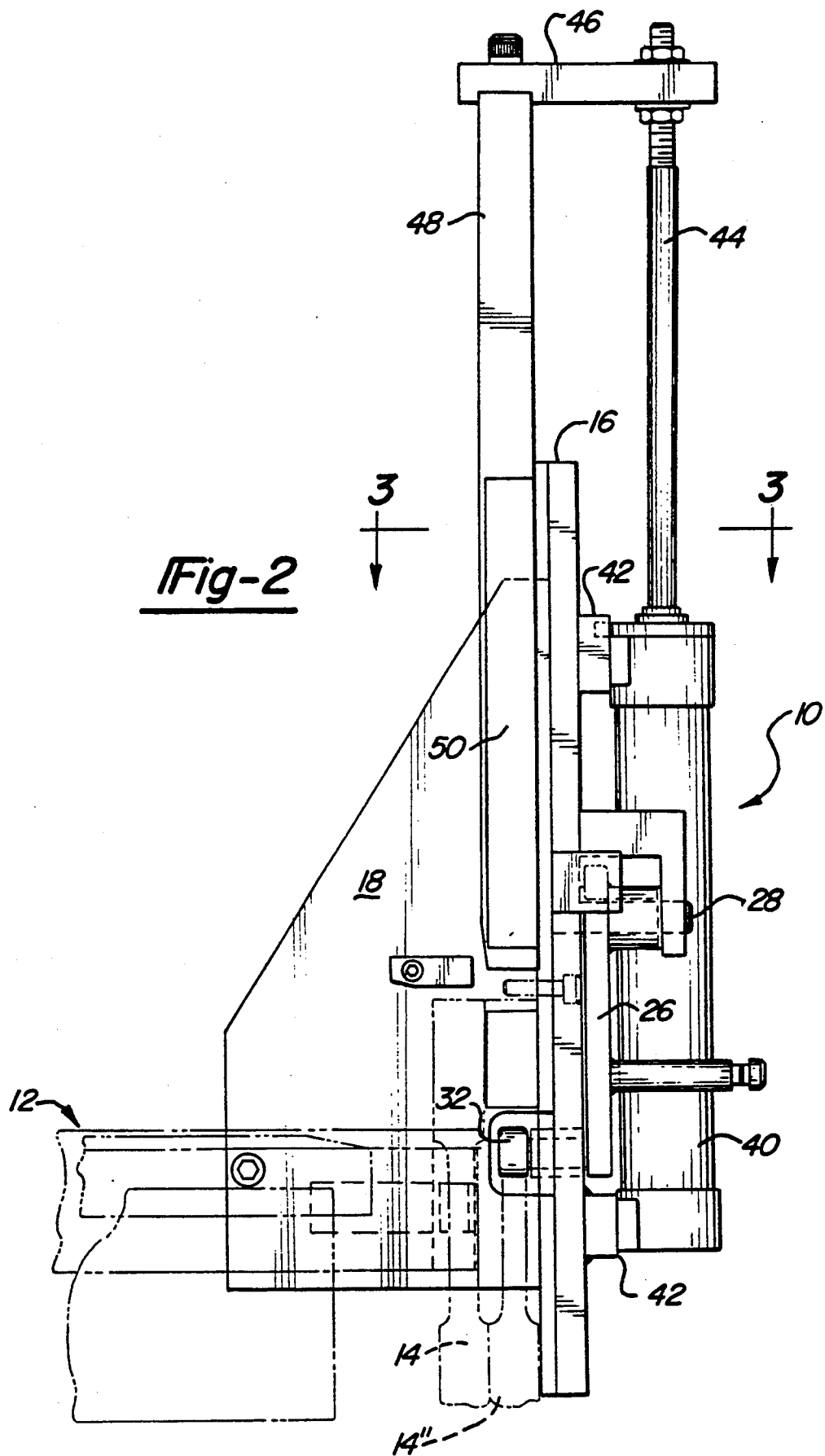

CONVEYOR UNLOADING MECHANISM

BACKGROUND OF THE INVENTION

1. Field of the Invention

This invention relates to a conveyor unloading or discharge mechanism. More particularly, this invention relates to a discharging or stripping mechanism for removing parts, one at a time, from an accumulating type conveyor.

2. Description of the Prior Art

There are many types of conveyor discharge or ejecting systems, and the particular type that is chosen depends on many factors such as the type of conveyor to which the mechanism is applied, and the equipment or location to which the parts are being discharged.

With an accumulating type conveyor, parts are conveyed, usually in a single row by step by step advancement. The parts accumulate or stack up in an abutting relationship at a discharge point or the end of the conveyor. A widely accepted type of accumulating conveyor is known as a lift and carry or walking beam conveyor. One such conveyor of an advanced design is described in U.S. Pat. No. 4,838,411. The conveyor of this patent utilizes a pair of elongated, spaced apart and parallel stationary rails. A pair of movable rails are located between the stationary rails and are capable of moving from a point below the stationary rails to a point above the stationary rails, and from a retracted position to an advanced or forward position. Thus parts resting on the stationary rail, are picked up by the movable rails, and moved forward on the conveyor to a point where they are again lowered to a resting position on the stationary rails. This type of conveyor is particularly advantageously used in conveying not only parts that extend above the rails but also elongate parts which extend between the rails. For example, automotive connecting rods can be conveyed with or without a cap attached to the beam while the beam extends between the rails, or the cap can be conveyed alone supported entirely above the rails.

When the parts are to be removed from the conveyor one at a time, one of simplest type of discharge units employs a staking member which is caused to be inserted between abutting parts in a fashion to push the part at the end of the conveyor to a drop discharge while holding the next part from advancing. This can result in a somewhat harsh and erratic handling of the part which may mark or mar the part by the staking impact or the subsequent guiding contact. This can be entirely unsatisfactory for many parts, particularly in the automotive field as in the foregoing example of conveying and discharging connecting rods.

SUMMARY OF THE INVENTION

The present invention provides a discharge or a metered stripping mechanism for ejecting parts one at a time and upon command from an accumulating conveyor. The stripper assembly includes a pair of part holding and releasing lever arms. These arms are biased towards each other so as to engage a part between them. Preferably, the lever arms are pivoted at one of their ends and have rollers at their other free ends which engage the part. A spring attached to a midpoint of the arms is used to bias them towards each other. An adjustable stop presses against the upper end of each lever arm to limit the movement of the lever arms towards each other so that a single part can be freely fed from the accumulating conveyor to a loading position between the lever arms. A push blade engages the upper end of the part to push the part through the lever arms as the blade is guided by a pair of gibs. A fluid cylinder, usually a hydraulic cylinder, is used to actuate the blade and can be controlled in any conventional manner.

Preferably the cylinder with the push blade connected to the piston rod and the gibs are all mounted on a vertically extending mounting plate. The part holding and releasing lever arms are also pivotally attached to the mounting plate. A pair of side plates extend from the mounting plate for attachment to the frame of the accumulating conveyor. The rollers on the pivoted lever arms follow the contour of the part as it is being pushed to a gravity release position so that there is no marking or marring of the part.

The foregoing advantages and others will become apparent from the following description and the accompanying drawing.

BRIEF DESCRIPTION OF THE DRAWING

FIG. 2 is a side elevational view of the stripper assembly of FIG. 1 showing a part in the loading position and the next adjacent abutting part as these parts are being delivered to the stripper assembly from the accumulating conveyor;

DETAILED DESCRIPTION OF A PREFERRED EMBODIMENT OF THE PRESENT INVENTION

Figure 1:
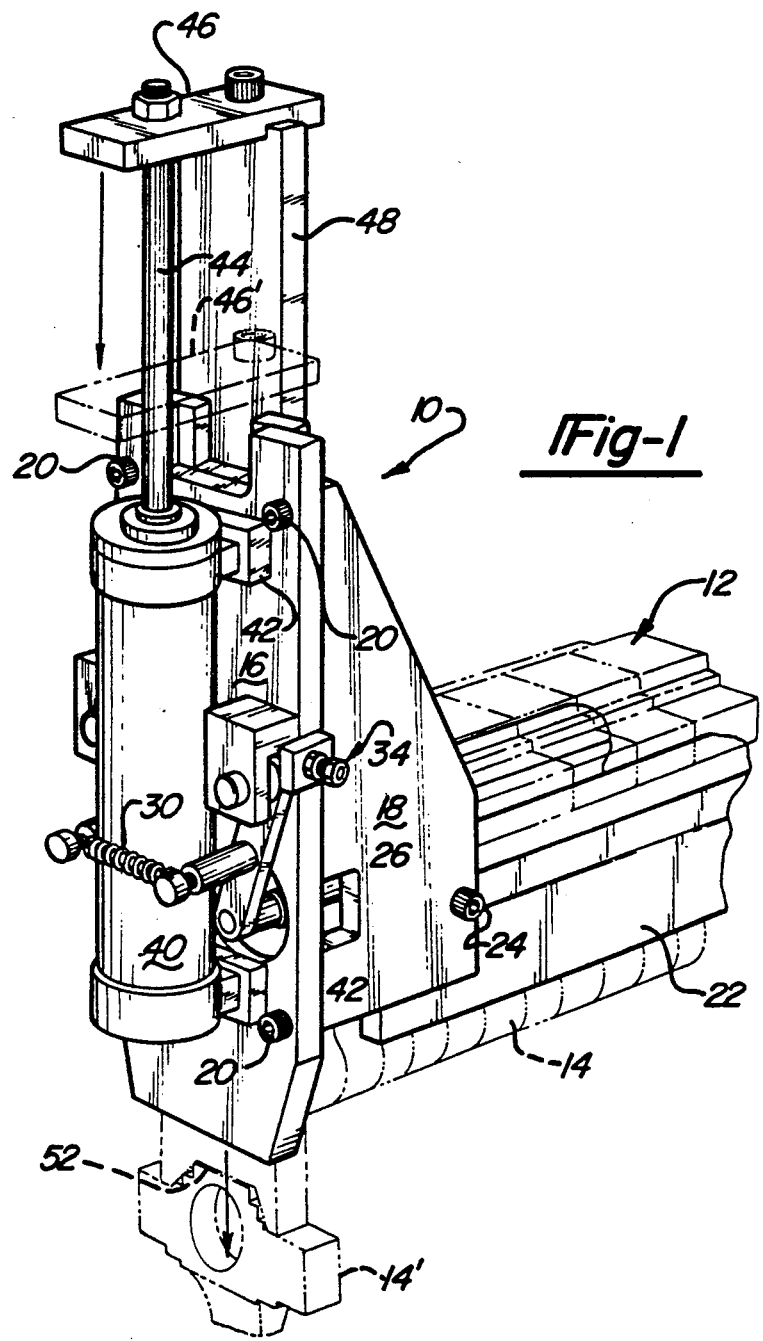
FIG. 1 is a perspective view of the conveyor unloading mechanism or stripper assembly of this invention attached to an accumulating conveyor, showing the assembly in full line in the part loading position and in phantom line in the part discharge position.
Figure 3:
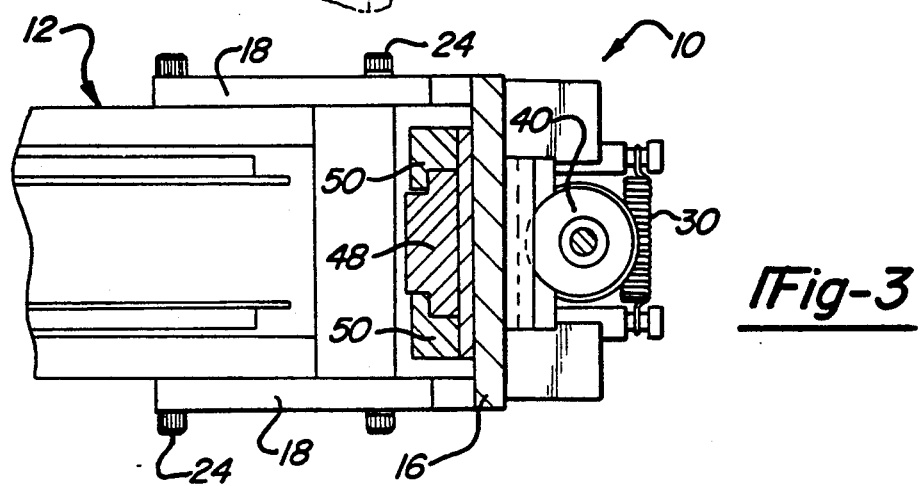
FIG. 3 is a cross sectional view taken along line 3—3 of FIG. 2.

With particular reference to FIGS. 1 and 2, the stripper assembly 10 is shown attached to an accumulating conveyor 12 conveying parts 14 in the form of automotive connecting rods to the gravity discharge position 14' shown in FIG. 1. The stripper assembly has a frame including a mounting plate 16 and parallel side plates 18. The side plates 18 are connected to the mounting plate 16 by machine screws 20, and the side plates 18 are connected to frame member 22 of the accumulating conveyor 12 by machine screws 24.

A pair of part holding and releasing lever arms 26 are pivotally attached to mounting plate 16 at 28, being biased towards each other by spring 30 bringing rollers 32 at the bottom end of lever arms 26 into rolling contact with the part or connecting rod 14. Adjustable stops 34 have machine screws 36 which act against the upper portion 38 of levers 26 to limit the inward movement of the lever arms 26 so that the parts 14 can be moved into the loading position of the part as shown at 14" in FIG. 4 by the advancing action of the accumulating conveyor 12.

A fluid motor in the form of a hydraulic cylinder 40 is attached to mounting plate 16 by brackets 42 so that its piston rod 44 extends upwardly for connection to cross member 46. Attached to and extending downwardly from cross member 46 is push blade 48 which is retained and guided relative to mounting plate 16 by gibs 50. Push blade 48 is bifurcated at its lower end 52 to conform with the shape of the part 14 which it engages.

Figure 4:
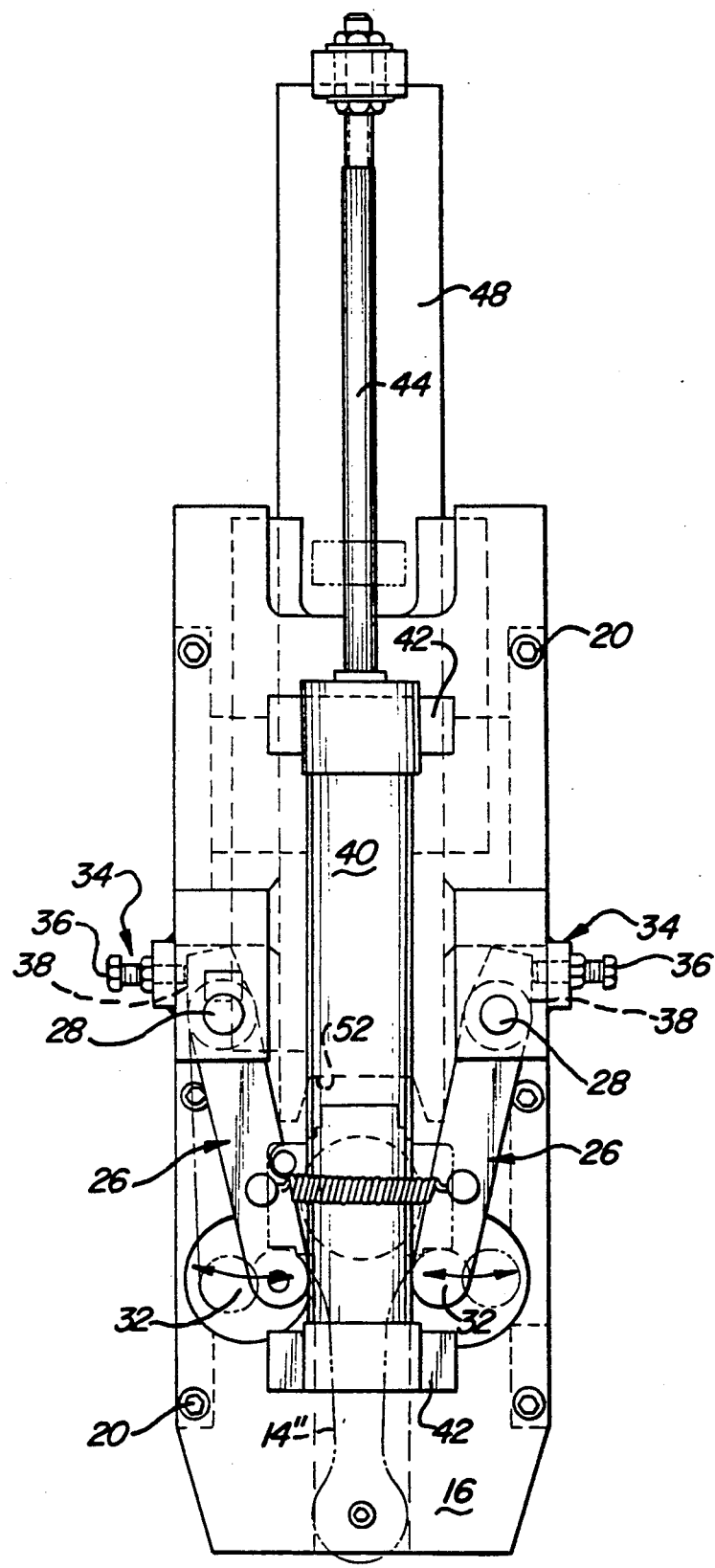
FIG. 4 is a front elevational view of the stripper assembly of FIG. 1.

In operation, a part 14 is advanced by accumulating conveyor 12 into its loading position as shown at 14" in FIGS. 2 and 4. The lever arms 26 are held in their innermost position by stops 34 so that no initial contact will be made between the part and rollers 32 or the end 52 of push blade 48. When the part has been pushed into this loading position the cylinder 40 is reciprocated to retract piston rod 44 bringing the blade 48 downward so the bifurcated end 52 contacts the part 14 to push it through the lever arms 26 to a position shown at 14' in FIG. 1 where it is released to be discharged by gravity as shown by the arrow. The blade 48 prevents another part from moving into the loading position until the piston rod 44 is in its fully upward position, at which point the metering assembly can accept the next part to be discharged.

During the downward movement of the part 14, the rollers 32 at the lower end of pivot arm 26 are maintained in rolling contact with the contour of the part presenting no wear or scratching of the part.

From the foregoing, it can be seen that the present invention provides a simple and yet highly effective unloading mechanism or stripper assembly for ejecting parts one at a time from a lift and carry or other type of accumulating conveyor.

Having described my invention, many modifications will be apparent to those skilled in the art to which it pertains without deviation from the spirit of the invention as defined by the scope of the appended claims.

The embodiments of the invention in which an exclusive property or privilege is claimed are defined as follows:

1. A stripper assembly for discharging parts one at a time from an accumulating conveyor comprising:
   a pair of part holding and releasing lever arms;
   biasing means for biasing said lever arms towards each other to engage a part between said lever arms;
   stop means engaging said lever arms to limit the movement of the lever arms toward each other so that a single part can be freely fed between said lever arms;
   a push blade for moving said part through said lever arms against the bias of said biasing means;
   a pair of gibs for guiding said push blade; and
   means for reciprocating said push blade in said gibs from a part loading position to a part discharge position as the part is being retained between said lever arms;
   wherein said lever arms, push blade and gibs are located in a generally vertical plane so that as said part is pushed through said lever arms by said push blade, the part is released to move away from the stripper assembly by gravity.

2. The stripper assembly according to claim 1 wherein said biasing means includes a spring located between said lever arms urging the arms towards each other.

3. The stripper assembly according to claim 1 wherein said means for reciprocating said push blade includes a hydraulic cylinder.

4. A stripper assembly for discharging parts one at a time from an accumulating conveyor comprising:
   a substantially vertically extending mounting plate;
   a pair of substantially vertically extending side plates attached to said mounting plate for mounting said stripper assembly on said accumulating conveyor;
   a pair of part holding and releasing lever arms pivotally attached to said mounting plate;
   biasing means for biasing said lever arms toward each other to engage a part between said lever arms;
   stop means for limiting the movement of said lever arms toward each other by said biasing means so that a single part can be freely fed between said lever arms by said conveyor;
   a pair of parallel vertically extending gibs attached to said mounting plate;
   a push blade mounted between and guided by said gibs; and
   a fluid cylinder attached to said mounting plate having its piston rod attached to said blade so as to reciprocate said blade between said lever arms in engagement with said part, from a part loading position to a part discharge position as the part is being held between said lever arms.

5. A stripper assembly for discharging parts one at a time from an accumulating conveyor comprising:
   a pair of part holding and releasing lever arms;
   biasing means for biasing said lever arms towards each other to engage a part between said lever arms;
   stop means engaging said lever arms to limit the movement of the lever arms toward each other so that a single part can be freely fed between said lever arms;
   a push blade for moving said part through said lever arms against the bias of said biasing means, said lever arms having rollers which hold said part and roll against the contour of said part as it is being moved by said push blades;
   a pair of gibs for guiding said push blade; and
   means for reciprocating said push blade in said gibs from a part loading position to a part discharge position as the part is being retained between said lever arms.

* * * * *